United States Patent Office 3,534,021
Patented Oct. 13, 1970

3,534,021
METHYLATION OF 1,4-BENZODIAZEPINES
Michael Edward Derieg, West Orange, Rodney Ian Fryer, North Caldwell, and Leo Henryk Sternbach, Upper Montclair, N.J., assignors to Hoffmann-La Roche Inc., Nutley, N.J., a corporation of New Jersey
No Drawing. Filed May 20, 1968, Ser. No. 730,638
Int. Cl. C07d 53/06
U.S. Cl. 260—239.3                                    8 Claims

ABSTRACT OF THE DISCLOSURE 1,4-benzodiazepines are methylated at the 1-position utilizing dimethylsulfonium methylide or dimethyloxysulfonium methylide as reagent.

DESCRIPTION OF THE INVENTION

The present invention relates to a process for the methylation of 1,4-benzodiazepines utilizing dimethylsulfonium methylide or dimethyloxysulfonium methylide as the methylating agent. The reactive site on the 1,4-benzodiazepine nucleus for the methylation reaction is the nitrogen atom in the 1-position of the ring structure. The resulting 1-methyl derivatives of the 1,4-benzodiazepine series of compounds have well-established utility as tranquilizers, muscle relaxants, anticonvulsants and hypnotics.

The process of the present invention involves treating a compound of the general formula:

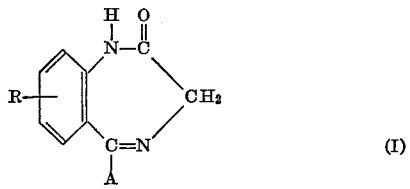

where A is phenyl, substituted phenyl, and pyridyl; and R is hydrogen, lower alkyl, lower alkoxy, halogen, trifluoromethyl and nitro with a methylating agent selected from the group consisting of dimethylsulfonium methylide and dimethyloxysulfonium methylide to produce the corresponding N-methyl derivative represented by the following formula:

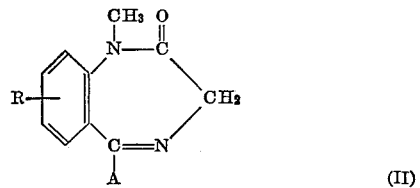

where A and R are as above.

In one preferred aspect of the process of the present invention, A above is phenyl. When A is substituted phenyl, it is generally preferred that the substituents be selected from the group consisting of lower alkyl, halogen, trifluoromethyl and nitro, with these substituents being located in either the ortho or para positions of the aromatic ring.

Similarly, with respect to another preferred aspect of the present invention, R is halogen, most preferably chlorine and is located at the 7-position of the benzodiazepine nucleus.

The subject process of the present invention is preferably conducted in the presence of dimethylsulfoxide as solvent. It is also possible to utilize mixed solvents, i.e., dimethyl sulfoxide plus a second inert solvent medium. Examples of suitable secondary solvents to be used in conjunction with dimethylsulfoxide include, for example, aromatic hydrocarbons such as benzene, toluene, xylene, etc., tetrahydrofuran, ether, and dimethylformamide, among others.

When dimethylsulfonium methylide is utilized as a methylating agent, the reaction of the present process may be conducted at a temperature within the range of from about 0 to $-25°$ C. It should be noted that at the lower temperatures of this range, it may be necessary to be selective in the choice of solvents so as to prevent solidification thereof. The upper limit of this range is determined essentially by the stability of the methylating reagent. Thus, temperatures above $0°$ are not generally desirable since the dimethylsulfonium methylide may begin to decompose at such higher temperatures.

When dimethyloxysulfonium methylide is utilized as the methylating reagent, the upper temperature limit restriction may be raised to a level of about $75°$ C. since this compound is substantially more stable than its desoxy analogue.

It is generally desired that the reaction of the present invention be conducted under anhydrous conditions, thus, dictating the employment of dry solvents for use in such reactions. It may also be desirable to utilize an inert atmosphere, such as nitrogen, over the reaction solution to produce best results.

The methylating agent is generally employed in at least a 2 molar excess to the 1,4-benzodiazepin-2-one substrate. This is believed to be due to the fact that the methylating agent of the present invention acts both as a base, i.e., by abstraction of the proton of the amide nitrogen, as well as a methylating agent. But such an interpretation of the mechanism is not of course in any way a limit on the invention.

The methylating agents used in the present process are prepared conveniently in situ by action of a very strong base e.g., an organo-metallic salt or sodium hydride, e.g., n-butyllithium or trimethylsulfonium iodide (for the case of dimethylsulfonium methylide) or sodium hydride on trimethyloxysulfonium iodide (for the case of dimethyloxysulfonium methylide).

The reaction equations for the process of the present invention in both its aspects may be conveniently summarized by the following equations, which are presented for the purpose of illustration only:

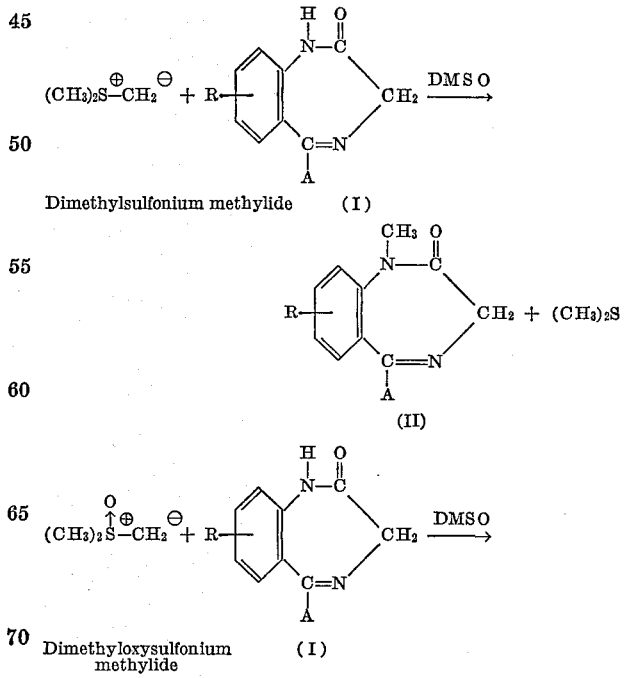

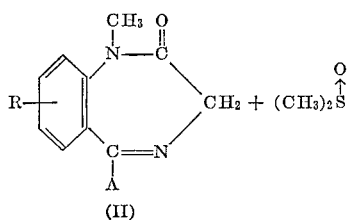

(II)

The process of the present invention may be more clearly understood by reference to the following examples. All temperatures in these examples are in degrees centigrade.

EXAMPLE 1

Dimethylsulfonium methylide

A solution of 0.06 mole of dimethylsufonium methylide in 50 ml. of dried dimethylsulfoxide and 100 ml. of dried tetrahydrofuran was prepared as follows. A solution of 0.06 mole of n-butyllithium in pentane (total volume 46.8 ml.) was added dropwise to a stirred suspension of 18.5 g. (0.06 mole) of powdered trimethylsulfonium iodide in 50 ml. of dry dimethylsulfoxide and 100 ml. of dry tetrahydrofuran chilled in a bath of ice-acetone to about $-10°$ C. and under dried $(H_2SO_4)$ nitrogen. Stirring was continued about 5 minutes.

A total of 5.4 g. (0.02 mole) of 7-chloro-5-phenyl-3H-1,4-benzodiazepin-2(1H)-one was added to the ylide solution. The reaction mixture was stirred at $-10°$ for 1 hour and then overnight at room temperature. The reaction mixture was treated in vacuo to remove most of the THF and the resultant solution partitioned between water and benzene. The organic layer was water-washed several times and evaporated to dryness, leaving 3.5 g. of a solid. The solid residue was treated with hot ether and the insoluble material was removed leaving a filtrate which on evaporation yielded a solid residue. This residue was purified by the use of preparative thin layer chromatography on fluorescent silica using 4:1 hexane-ethyl acetate as the elution system. The desired product 7-chloro-1-methyl - 5 - phenyl-3H-1,4-benzodiazepin-2(1H)-one was the first major component to be eluted and was obtained as colorless prisms, melting at 130–132°.

EXAMPLE 2

Dimethyloxysulfonium methylide

Dimethyloxysulfonium methylide (0.06 mole) was prepared by the addition of 100 ml. of dried DMSO to a stirred mixture of 10.4 g. (0.06 mole) of trimethyloxysulfonium iodide and 2.9 g. of a 50% dispersion of sodium hydride (0.06 mole) in mineral oil. The reaction mixture was stirred under nitrogen until the evolution of hydrogen ceased (ca. 30 minutes). To the stirred mixture containing ylide, 5.4 g. (0.02 mole) of 7-chloro-5-phenyl-3H-1,4-benzodiazepin-2(1H)-one suspended in 100 ml. of THF was added and the reaction mixture was heated to 60° and so maintained for about three hours. The reaction mixture was poured into about four volumes of water and was extracted with benzene. The organic extract was washed with water, dried and evaporated to dryness to yield a gum. Trituration with ether and washing with hexane gave 7-chloro-1-methyl-5-phenyl-3H-1,4-benzodiazepin-2(1H)-one, melting point 125–128°.

What is claimed is:

1. A process for methylating a compound of the formula:

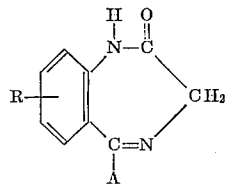

(I)

where A is phenyl, substituted phenyl, and pyridyl; and

R is hydrogen, lower alkyl, lower alkoxy, halogen, trifluoromethyl and nitro which process comprises treating said compound with a methylating agent selected from the group consisting of dimethylsulfonium methylide and dimethyloxysulfonium methylide in the presence of a solvent medium comprising dimethylsulfoxide to produce a compound of the formula:

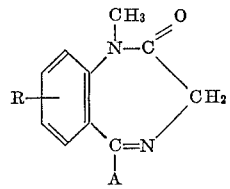

2. The process of claim 1 wherein said methylating agent is employed in at least a two molar excess.

3. The process of claim 1 wherein dimethylsulfonium methylide is utilized as a methylating agent and the process is conducted at a temperature within the range of from about $0°$ to $-25°$ C.

4. The process of claim 1 wherein dimethyloxysulfonium methylide is utilized as a methylating agent and the process is conducted at a temperature within the range of from about $-25°$ to about $75°$ C.

5. The process of claim 1 wherein A is phenyl and R is halogen substituted at the 7-position.

6. The process of claim 5 wherein said halogen is chlorine.

7. The process of claim 1 wherein the process is conducted under an inert atmosphere.

8. The process of claim 1 wherein the process is conducted in the presence of a second solvent.

References Cited

UNITED STATES PATENTS 3,371,085    2/1968    Reeder et al. _____ 260—239.3

HENRY R. JILES, Primary Examiner

R. T. BOND, Assistant Examiner

U.S. Cl. X.R.

260—239, 999